April 25, 1961 F. W. ROBSON ET AL 2,981,265
MULTIPLE COMPARTMENT DISHWASHER HAVING A LIQUID LEVEL CONTROL
Filed Aug. 5, 1958 3 Sheets-Sheet 1
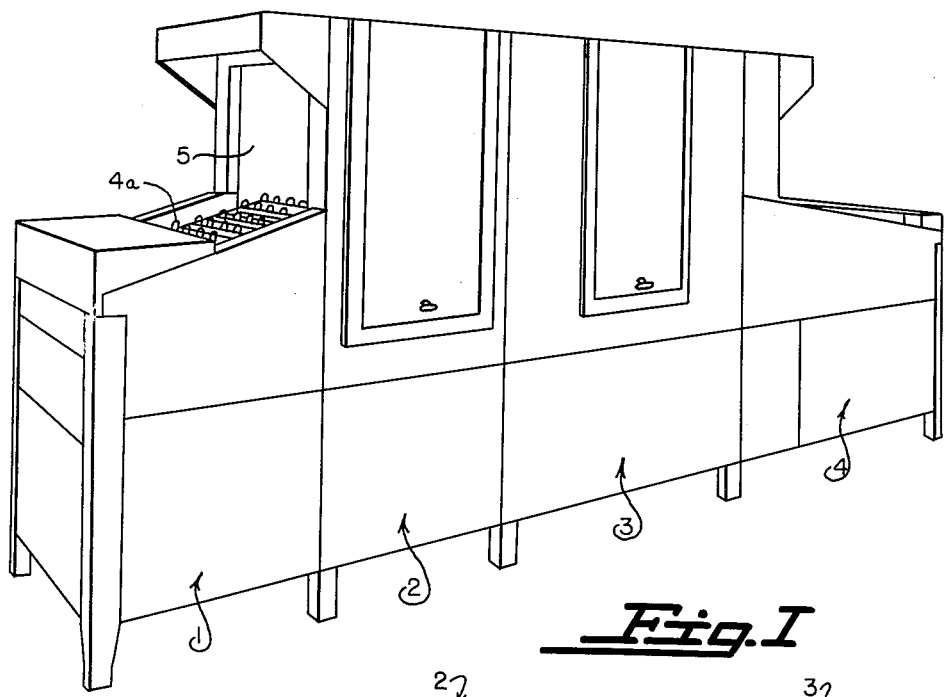
Fig. I
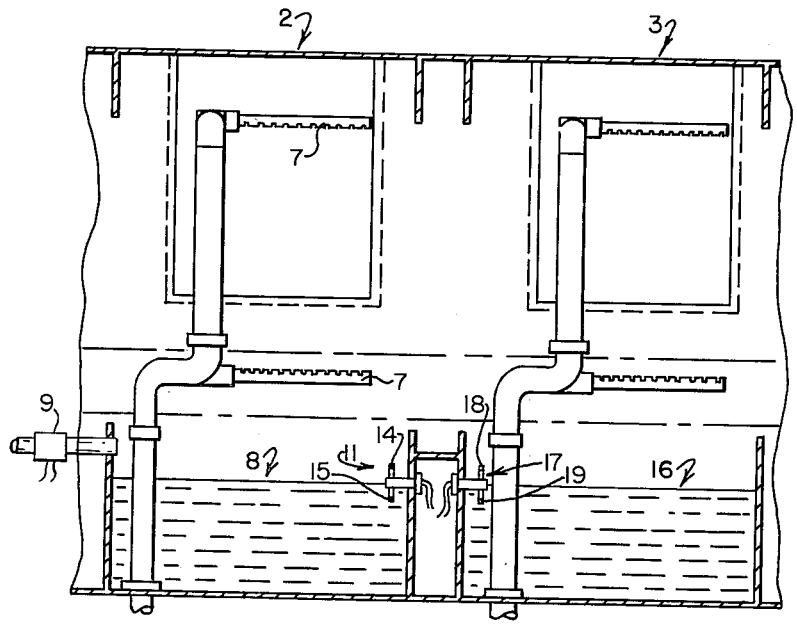
Fig. II
INVENTORS.
FREDERICK W. ROBSON
THOMAS R. SEAMAN
BY
Marshall, Marshall & Yeasting
ATTORNEYS

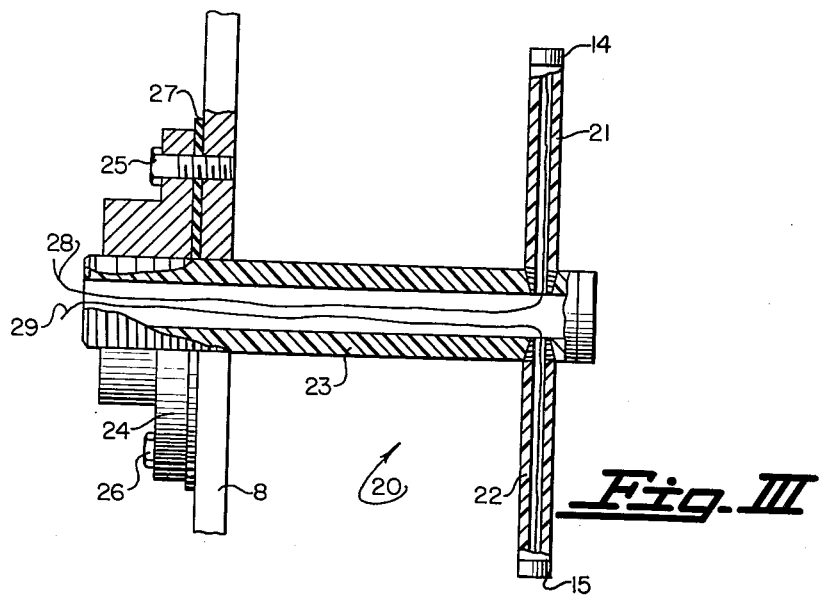
Fig. III
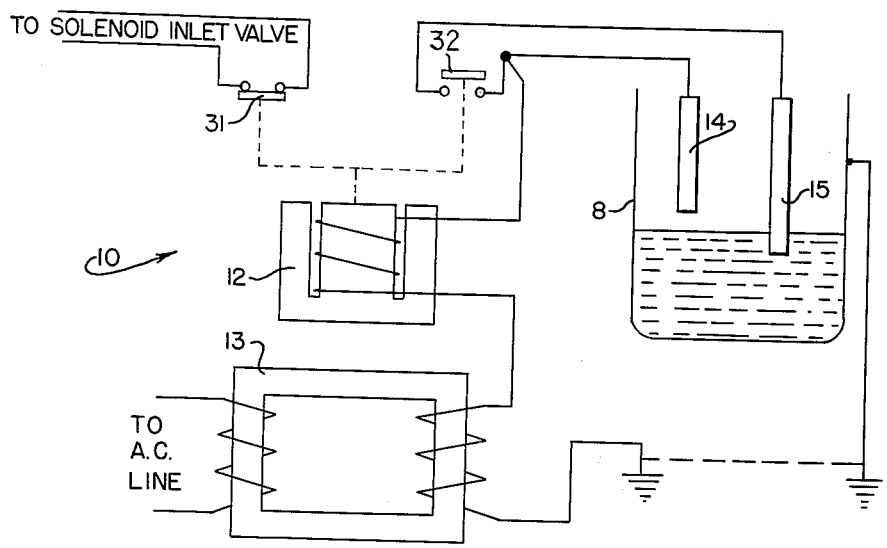
Fig. IV
INVENTORS.
FREDERICK W. ROBSON
THOMAS R. SEAMAN

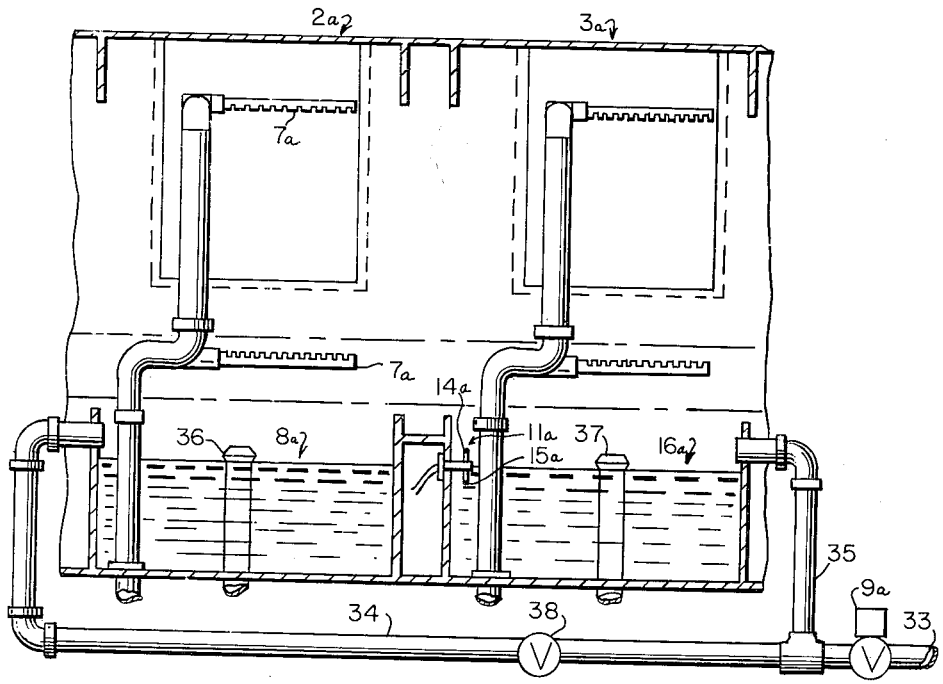
Fig. V
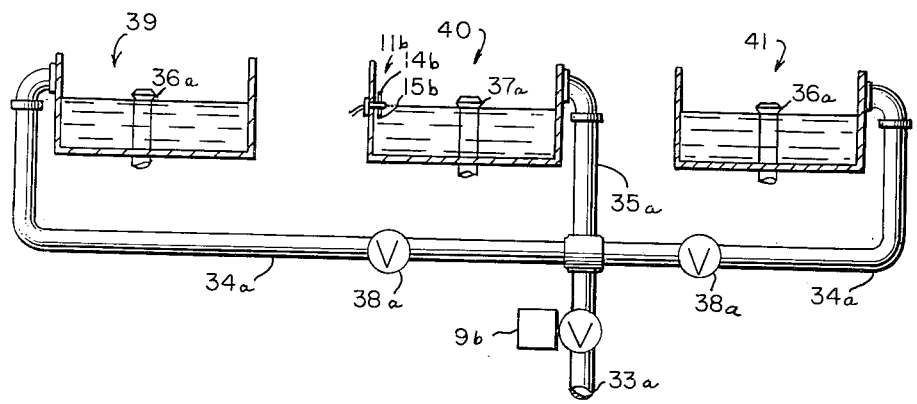
Fig. VI
INVENTORS.
FREDERICK W. ROBSON
THOMAS R. SEAMAN
BY
Marshall, Marshall & Yeasting
ATTORNEYS United States Patent Office 2,981,265
Patented Apr. 25, 1961

2,981,265

MULTIPLE COMPARTMENT DISHWASHER HAVING A LIQUID LEVEL CONTROL

Frederick W. Robson and Thomas R. Seaman, Rochester, N.Y., assignors to Toledo Scale Corporation, Toledo, Ohio, a corporation of Ohio Filed Aug. 5, 1958, Ser. No. 753,362

3 Claims. (Cl. 134—57)

This invention relates to commercial conveyor-type dishwashers and in particular to water level controls for the tanks of such dishwashers.

Commercial conveyor-type dishwashers usually are provided with one, two, or three tanks.

A one-tank machine ordinarily has a wash and final rinse compartment with detergent-containing water in its single tank, dishes being washed in the compartment with the detergent-containing water which is recirculated in the tank and being rinsed in the compartment with fresh hot water that is supplied from a source outside of the dishwashing machine.

A two-tank machine may have a prewash compartment with prewash water in its tank, and a wash and final rinse compartment with detergent-containing water in its tank, dishes being cleansed of food particles in the prewash compartment by the prewash water which is recirculated in the prewash tank, and being washed in the wash and final rinse compartment with the detergent-containing water which is recirculated in the wash tank and being rinsed in the wash and final rinse compartment with fresh hot water that is supplied from a source outside of the dishwashing machine.

A three-tank machine may have a prewash compartment, similar to the prewash compartment in the two-tank machine, a wash compartment with detergent-containing water in its tank, and a power rinse and final rinse compartment with rinse water in its tank, dishes being successively cleansed of food particles in the prewash compartment, washed in the wash compartment with the detergent-containing water which is recirculated in the wash tank, and rinsed in the power rinse and final rinse compartment once with hot rinse water which is recirculated in the rinse tank and again with fresh hot water that is supplied from a source outside of the dishwashing machine.

To replenish losses of water from the tanks, which is carried out of the machines on the articles that have been washed, fresh water must intermittently be added to maintain a given volume of water in the tanks.

In previous commercial dishwashers, the addition of water was accomplished by manually opening water inlet valves or by means of ordinary float valves, the water being prevented from rising above a given level due to the incorporation of overflow stand pipes in the tanks, if, in the first example, the operator forgot to turn off a valve, or, in the second example, in case of failure of a float valve.

In such prior systems using manually operated valves, it was possible to add too much or too little fresh water to the supply in the tanks. If too much water was added, it wasted through the overflow stand pipes thus defeating the purpose of the tanks which is to conserve hot water and detergents. If too little water was added, decreased efficiency of cleansing resulted.

In such prior systems using float valves, it also was possible to add too much or too little fresh water to the supply in the tanks. The float valves sometimes were actuated prematurely by turbulence of the liquid in the tanks or sometimes were fouled by food particles and were not actuated at all.

It is, accordingly, the principal object of this invention to provide means for controlling the level of water in the tanks of dishwashing machines which is free of the foregoing and other disadvantages.

Another object of the invention is to provide a dishwashing machine with water level controls which will regulate the depth of water automatically.

Still another object of the invention is to provide a commercial-type dishwashing machine having a plurality of tanks with a single water level control of low cost which may be located in any one of the tanks and which controls the depth of water in all of the tanks.

These and other objects and advantages will be apparent from the following description of preferred forms of the invention.

According to the invention, a dishwasher having one or more tanks is equipped with at least one electrode type water level control. In the case of a dishwasher having a plurality of tanks, there may be an electrode type water level control for each one of the tanks; or there may be such a control for only one of the plurality of tanks, the others of the tanks being kept supplied with water by means of bleed lines connected to the main water supply which is under the control of the single electrode type level control.

In the drawings, wherein preferred embodiments of the invention are shown:

Fig. I is a perspective view of a dishwasher embodying the invention;

Fig. II is a side elevational view of the dishwasher illustrated in Fig. I, parts being broken away and parts being shown in section;

Fig. III is an enlarged view, partly in section, of an electrode used in a dishwasher embodying the electrode level control of the invention;

Fig. IV is a schematic diagram of the circuits employed in a dishwasher embodying the electrode type level control;

Fig. V is a view which is similar to Fig. II showing a modified two-tank dishwasher wherein a single electrode type level control in one of the tanks regulates the depth of water in both of the tanks; and Fig. VI is a fragmentary diagrammatic view of a three-tank dishwasher similar in principle to the dishwasher illustrated in Fig. V, showing another modification wherein a single electrode in one of the tanks regulates the depth of water in all of the tanks.

These specific figures and the accompanying description are intended to illustrate and describe preferred forms of the invention, but not to impose limitations on its scope.

The commercial conveyor-type dishwasher which is illustrated in Fig. I is a two-tank machine and includes a loading unit 1, a prewash compartment 2, a wash and final rinse compartment 3, and an unloading unit 4. Dishes or other articles to be washed placed upon a conveyor 4a at the loading unit 1 are carried through an entrance opening 5 into the prewash compartment 2 (see Fig. II) where they are cleansed of food particles by recirculating water. (Alternatively, the dishes may be prewashed by fresh water from a source outside of the machine [city water line] as shown and described in U.S. Patent No. 2,746,466 to J. D. Clague and A. W. Haas.) Upon completion of the prewashing step, the dishes are successively washed with soapy or detergent-containing recirculating water and rinsed with fresh hot water in the wash and final rinse compartment from a source outside of the machine; such fresh water rinse not being shown but being like that illustrated and described in the hereinbefore mentioned U.S. Patent No.

2,746,466, and then are delivered through an exit opening to the unloading unit 4 from which they finally are removed.

During the time that the dishes are in the prewash compartment 2, nearly all of the water being sprayed upon them from nozzles 7 is being collected and returned to a prewash tank 8 from whence it came. But unavoidably some of the water is carried out of the prewash compartment 2 by the dishes. Thus, as each successive batch of dishes passes through the prewash compartment 2 less prewash water is returned to the prewash tank 8. Due to this loss of prewash water, additional fresh water must be injected into the prewash tank 8 to replenish the decreasing supply. The additional water enters the prewash tank 8 through a solenoid inlet valve 9 which is electromagnetically operated by an activating unit 10 (Fig. IV) of an electrode type level control 11.

The activating unit 10 of the electrode type level control 11 is located outside of the prewash compartment 2 but in close proximity thereto. The activating unit 10 of the electrode type level control 11 is a commercially available unit which consists of a matched relay 12 and transformer 13. The activating unit 10 is connected to a pair of insulated stainless steel electrodes 14 and 15. The electrodes 14 and 15 are suspended within the prewash tank 8 where they contact the surface of the prewash water at predetermined levels. One electrode 14 determines the upper limit of prewash water level while the other electrode 15 determines the lower limit. Thus, the level of the water is closely confined between the two limits, forestalling large and undesirable fluctuations.

The level of washing fluid within a wash tank 16 of the wash portion of the wash and final rinse compartment 3 is regulated in like manner by an electrode type level control 17 which employs electrodes 18 and 19 placed within the wash tank 16 and cooperating with the surface of the wash fluid stored within the wash tank 16. Since the construction, operation, and application of the electrode type level controls 11 and 17 are substantially identical, only the electrode type level control 11 employed in governing the depth of water in the prewash tank 8 is discussed in detail in this application, it being understood that what is said of the electrode level control 11 applies also to the level control 17.

An electrode unit 20 (Fig. III) containing the stainless steel electrodes 14 and 15 includes a pair of nylon tubes 21 and 22 upon which the stainless steel electrodes 14 and 15 are mounted. The electrodes can have any convenient shape such as the cylindrical form which is illustrated or, for example, they can be shaped like screws or bolts which are threaded into the ends of the nylon tubes 21 and 22, the heads of such screws or bolts being exposed to the water. The nylon tubes 21 and 22 are secured within tapped holes on the periphery of a comparatively large nylon pipe 23 and are displaced 180° from one another. The large nylon pipe 23 is secured within an opening in the side wall of the prewash tank 8 by a flanged nut 24. The flanged nut 24 is made fast by a pair of cap screws 25 and 26 which are inserted in the side wall of the prewash tank 8. The flanged nut 24 has interposed between it and the side wall of the prewash tank 8 a rubber gasket 27. The rubber gasket 27 forms a seal around the circular opening made in the side wall of the prewash tank 8 for the insertion of the large nylon pipe 23, thus, leakage of water from the circular opening is prevented. Lead wires 28 and 29, soldered to the electrodes 14 and 15, pass through the interior of their respective tubes 21 and 22 into the common large nylon pipe 23, thereby they leave the prewash tank 8 and are connected to the activating unit 10.

Operation

Dishes are carried into the prewash compartment 2 by the conveyor 4a where they are prewashed with an adequate amount of recirculating water. To minimize the cost of operation, the water is recirculated and reaccumulated in the same manner as in the recirculating water tanks illustrated in the hereinbefore mentioned U.S. Patent No. 2,746,466. A sufficient amount of water is maintained in the prewash tank 8 by regulating the depth of water therein with the electrode type level control 11. As the prewash water is depleted the level in the prewash tank drops until both of the stainless steel electrodes 14 and 15 are above the surface of the prewash water. Thus, the circuit completed by the conductivity of the prewash water is broken, causing deenergization of the relay 12. Deenergization of the relay 12 permits its normally closed load contact 31 to close and its normally open holding contact 32 to open whereupon the solenoid inlet valve 9 is opened to admit fresh water to replenish the supply in the prewash tank 8. As the level of the prewash water again rises, the relay 12 remains open temporarily after the lower electrode 15 is immersed because the holding contact 32 to the lower electrode 15 is open. However, as the prewash water engulfs the upper electrode 14 the relay 12 is energized and it opens normally closed load contact 31 and closes normally open holding contact 32 causing the solenoid inlet valve 9 to close and stop the flow of fresh water into the prewash tank 8.

The electrode type level control 11, similarly, is useful in a one-tank dishwasher which has a wash and final rinse compartment 3, with the compartment 3, with detergent-containing water in its single tank, dishes being washed in the compartment with the detergent-containing water which is recirculated in the tank and being rinsed in the compartment with fresh hot water that is supplied from a source outside of the dishwasher.

Alternatively, the depth of water in the pair of tanks 8 and 16 may be regulated by a single electrode type level control as illustrated in Fig. V. The modified dishwasher shown in Fig. V is preferred over the one shown in Fig. II because the regulation of the depth of water in two tanks by means of only one electrode type level control is a cost saving feature. The modified dishwasher differs from the dishwasher shown in Figs. I and II in that the dishes are rinsed in an area to the right and beyond the wash compartment. Reference numbers in Fig. V which are similar to those in Fig. II identify parts which are alike in structure and in function.

Water is replenished in tanks 8a and 16a by means of a main water inlet pipe 33 which has a branch 34 leading to the prewash tank 8a and a branch 35 leading to the wash tank 16a. Overflow stand pipes 36 and 37 are provided in the respective tanks which pipes communicate with a main discharge pipe to a drain (not shown).

A solenoid inlet valve 9a which is electromagnetically operated by an electrode type level control 11a controls the flow of water through the main water inlet pipe 33. The electrode type level control 11a is suspended within the wash tank 16a in contrast to the level control 11 which is suspended within the prewash tank 8. A hand-operated proportioning valve 38 which is adjusted with respect to the cycling of the solenoid valve 9a controls the flow of water through the branch water inlet pipe 34.

In operation, the level of the water in the wash tank 16a is closely confined between the two limits determined by the electrodes 14a and 15a of the level control 11a, the level control 11a causing on and off operation of the solenoid inlet valve 9a at suitable intervals.

The electrode type level control 11a also indirectly controls the level of the water in the prewash tank 8a which communicates through the branch pipe 34 with the main water inlet pipe 33. The flow of water through the branch pipe 34 is predetermined by being adjusted with respect to the cycling of the solenoid valve 9a (trial and error) by means of the manually operated proportioning valve 38. That is, for a few days after the dishwasher is first installed and operated, the valve 38 is regulated by hand until the volume of water passed by the valve 38, which automatically is supplied with fresh water from time to time from the solenoid inlet valve 9a, is enough or slightly more than enough, to replenish the prewash tank 8a; thereafter, the valve 38 is left more or less alone. Should too much water be passed by the valve 38, the level of the water in the prewash tank 8a is controlled by means of the overflow stand pipe 36. Should too much water enter the wash tank 16a because of some failure in the control system, the level of the water is controlled by means of the overflow stand pipe 37.

The electrode type level control 11a is located within the wash tank 16a instead of in the prewash tank 8a because the water in the wash tank contains expensive detergent so that it is desirable to control the level of the water closely to prevent detergent-containing water from going down the drain and at the same time to keep the wash water level high enough to maintain maximum efficiency of cleansing. Some waste of the prewash water by an occasional slight overflow down the stand pipe 36 wastes only hot water and not detergent-containing hot water.

A three-tank dishwasher is illustrated diagrammatically in Fig. VI; it includes a prewash tank 39, a wash tank 40, and a power rinse tank 41. Dishes are prewashed by means of water which is recirculated in the prewash tank 39 and are washed by means of detergent-containing water which is recirculated in the wash tank 40 in the same way as dishes are prewashed and washed in the dishwashers illustrated in Figs. I-V. The dishes are rinsed by means of water which is recirculated in the power rinse tank 41.

Water is replenished in tanks 39, 40, and 41 by means of a main water inlet pipe 33a which has branches 34a leading one to the prewash tank 39 and one to the power rinse tank 41 and a branch 35a leading to the wash tank 40. Overflow stand pipes 36a and 37a are provided in the respective tanks. Reference numbers in Fig. VI which are similar to those in Fig. V identify parts which are alike in structure and in function.

A solenoid inlet valve 9b which is electromagnetically operated by an electrode type level control 11b controls the flow of water through the main water inlet pipe 33a, the control 11b being suspended within the wash tank 40. Hand-operated proportioning valves 38a which are adjusted (trial and error) with respect to the cycling of the solenoid valve 9b control the flow of water through the branch water inlet pipes 34a.

In operation, the level of the water in the wash tank 40 is closely confined between the two limits determined by electrodes 14b and 15b of the level control 11b, the level control 11b causing on and off operation of the solenoid inlet valve 9b at suitable intervals.

The electrode type level control 11b also indirectly controls the level of the water in tanks 39 and 41 which communicate with the main water inlet pipe 33a. For a few days after the dishwasher is first used, the valves 38a are regulated by hand until the volume of water passed by the valves 38a, which automatically are supplied with fresh water from time to time by the solenoid inlet valve 9b, is enough or slightly more than enough to replenish tanks 39 and 41.

Should too much water be passed by the valves 38a, the level of the water in the tanks 39 and 41 is controlled by means of the overflow stand pipes 36a.

Various modifications may be made in specific details of construction without departing from the spirit and scope of the invention.

Having described the invention, we claim:

1. A dishwasher comprising, in combination, a plurality of compartments, conveying means for carrying articles to be cleaned through the compartments, tanks located one within each of the compartments for the purpose of maintaining a supply of liquid, means communicating with the tanks for recirculating liquid from the tanks and for spraying the articles in the compartments with such liquid, a main water inlet pipe communicating with a first one of the tanks, the main inlet pipe being connected to a source of fresh water, a branch water inlet pipe communicating with a second one of the tanks and being connected to the main inlet pipe, overflow means within the second tank, an electromagnetically operated valve in the main inlet pipe located in the system between the source of fresh water and the connection of the branch inlet pipe with the main inlet pipe, and an electrode type level control within the first tank that operates the electromagnetically operated valve according to the level of the liquid in the first tank, whereby the level of the liquid in the first tank is confined between predetermined limits and fresh water is supplied to the second tank through the branch inlet pipe whenever fresh water is supplied to the first tank, said overflow means within the second tank functioning to control the level of liquid in the second tank should such level rise above a predetermined limit.

2. A dishwasher according to claim 1 wherein a manually operated proportioning valve is located in the branch inlet pipe, whereby the volume of water passed by the proportioning valve, which automatically is supplied with fresh water from time to time by the electromagnetically operated valve, is enough or slightly more than enough to replenish the second tank.

3. A dishwasher according to claim 1 wherein the electrode type level control includes a pair of electrodes suspended at spaced levels within the first tank, one electrode determining the upper level of liquid and the other determining the lower level of liquid in the first tank.

References Cited in the file of this patent

UNITED STATES PATENTS

| | | |
|---|---|---|
| 1,281,864 | Sparr | Oct. 15, 1918 |
| 1,406,465 | Lynch | Feb. 14, 1922 |
| 1,512,918 | Forsgard | Oct. 28, 1924 |
| 1,664,637 | Merseles et al. | Apr. 3, 1928 |
| 1,820,981 | Le Fever | Sept. 1, 1931 |
| 2,202,197 | Ewertz | May 28, 1940 |
| 2,358,433 | Wolfner | Sept. 19, 1944 |
| 2,483,450 | Wolfner | Oct. 4, 1949 |
| 2,619,097 | Von Bromssen | Nov. 25, 1952 |
| 2,711,750 | Norcross | June 28, 1955 |
| 2,746,466 | Clague et al. | May 22, 1956 |
| 2,830,615 | Borell et al. | Apr. 15, 1958 |
| 2,914,935 | Sampsel | Dec. 1, 1959 |